(12) United States Patent
Everett

(10) Patent No.: US 6,830,260 B2
(45) Date of Patent: Dec. 14, 2004

(54) FOLDABLE INFANT JOGGING STROLLER

(76) Inventor: Richard C. Everett, 225 Sunshine La., West Lynn, OR (US) 97068

( * ) Notice: Subject to any disclaimer, the term of this patent is extended or adjusted under 35 U.S.C. 154(b) by 0 days.

(21) Appl. No.: 10/078,563

(22) Filed: Feb. 20, 2002

(65) Prior Publication Data
US 2003/0155745 A1 Aug. 21, 2003

(51) Int. Cl.$^7$ ................................................. B62G 1/00
(52) U.S. Cl. ....................................................... 280/642
(58) Field of Search .......................... 280/642, 62, 647, 280/650, 657, 658, 47.38, 47 A; D12/129; 403/109.1, 109.6, 109.7, 109.8, 377, 379.1

(56) References Cited

U.S. PATENT DOCUMENTS

| | | | | |
|---|---|---|---|---|
| 4,681,340 A | * | 7/1987 | Pasquini | 280/642 |
| 5,188,389 A | * | 2/1993 | Baechler et al. | 280/650 |
| D362,419 S | * | 9/1995 | Chih | D12/129 |
| 5,536,033 A | * | 7/1996 | Hinkston | 280/642 |
| 5,887,889 A | * | 3/1999 | Andrus | 280/647 |
| 5,934,757 A | * | 8/1999 | Smith | 280/642 X |
| 5,938,230 A | * | 8/1999 | Huang et al. | 280/650 |
| 6,036,220 A | * | 3/2000 | Zhen | 280/642 |
| 6,193,263 B1 | * | 2/2001 | Lin | 280/62 X |
| 6,550,802 B2 | * | 4/2003 | Sheehan | 280/658 |

OTHER PUBLICATIONS

U.S. Appl. No. 2002/0050700—filed May 2002.*

* cited by examiner

Primary Examiner—Bryan Fischmann
(74) Attorney, Agent, or Firm—Edward E. Roberts

(57) ABSTRACT

A foldable three-wheeled jogging stroller having a lower frame assembly including an axle for supporting two rear wheels, the axle having a pivotally coupled fork assembly to support a front wheel and a pair of fixedly attached upright support tubes. An upper frame assembly includes a U-shaped handlebar having first and second extension tubes each fixedly attached to an interconnect member, each interconnect member configured for hinged attachment of an upright support member and for slidably receiving a first end of one of third and fourth tubes whereby the interconnect member can slide freely along its respective tube to enable an erect upper frame assembly to fold into a collapsed position overlaying the base assembly. The other ends of the third and fourth tubes are attached to a footrest that further has extension tubes coupled to the front wheel support.

12 Claims, 9 Drawing Sheets

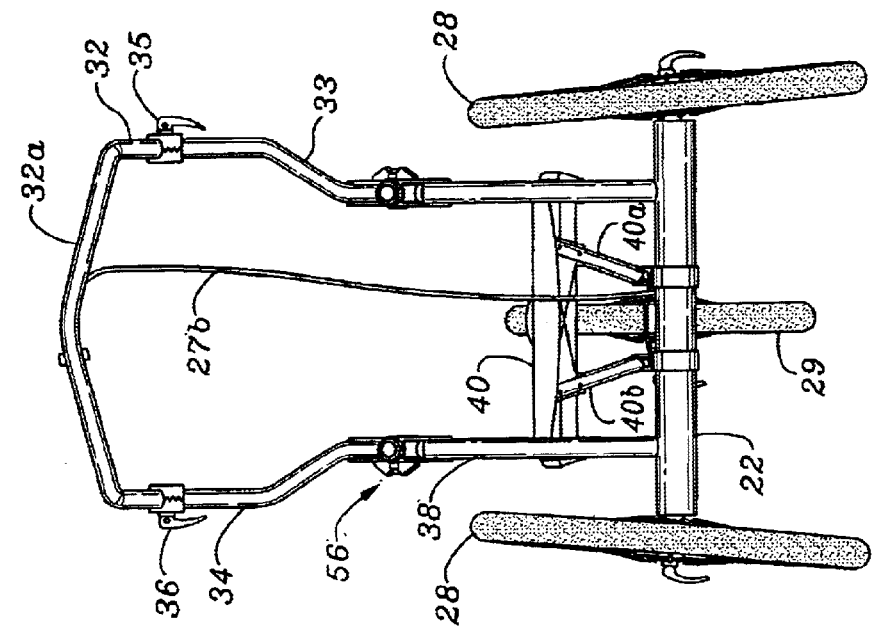
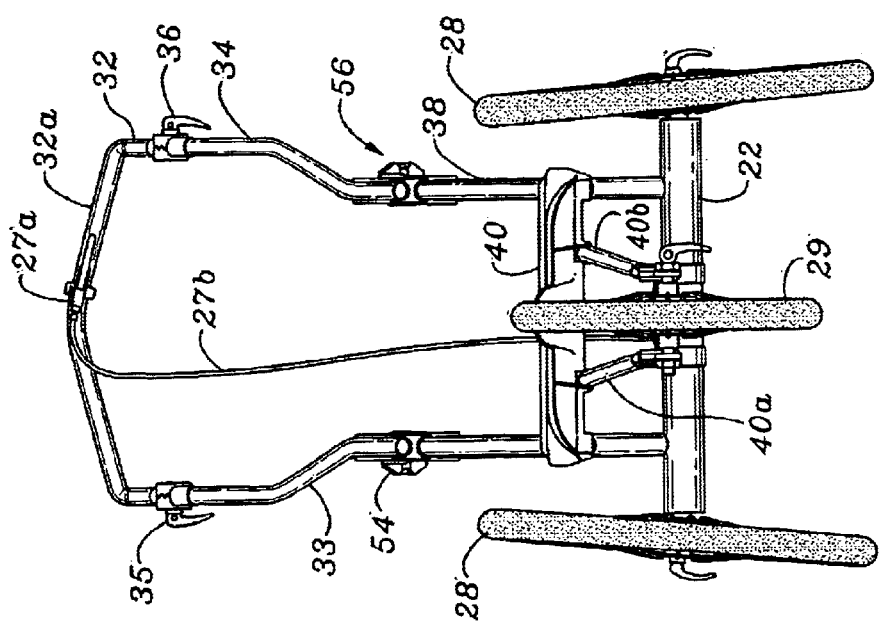

FOLDABLE INFANT JOGGING STROLLER

BACKGROUND OF THE INVENTION

The background of the invention will be discussed in two parts.

1. Field of the Invention

This invention relates to infant strollers, and more particularly to a three-wheeled jogging stroller that may be utilized during jogging or running exercise and that is easily foldable for transit and storage.

2. Description of the Prior Art

With physical fitness in mind, some infant strollers have evolved into primarily three-wheeled vehicles that can be utilized while jogging or running. Generally referred to as jogging strollers, the user, while pushing the infant, or infants, therein, may conveniently exercise by jogging or running. The typical three-wheeled jogging stroller is configured with a frame assembly formed of tubular aluminum for vehicular strength and light weight, one or two seats usually of a flexible cloth-like material, and pneumatic spoked-wheel tires. The two rear wheels are often of a diameter approximating that of an elementary school child's bicycle with the front wheel of the same or somewhat smaller diameter. Some such jogging strollers have been designed and configured for folding, disassembly, or a combination of both, thus providing for convenience and versatility in transportation and storage.

Various jogging strollers having mechanisms for folding the strollers are known in the art and generally include frame member connecting means for retaining the stroller frame members in non-folded state and release means for folding, or collapsing, the stroller frame members into a convenient configuration for transportation or storage. Some such folding mechanisms are disclosed in U.S. Pat. No. 5,536,033 issued to Paul Hinkston on Jul. 16, 1996, in U.S. Pat. No. 5,887,889 issued to Michael Andrus on Mar. 30, 1999, in U.S. Pat. No. 6,302,613 B1 issued to Red Lan on Oct. 16, 2001, and in U.S. Pat. No. 6,267,405 B1 issued to Chin-Chiao Chen on Jul. 31, 2001. Such devices are illustrative of the varied arrangements whereby attempts have been made to improve the folding, or collapsing of jogging strollers for ease of transit and storage.

However, the prior art folding devices remain limited in optimum folding characteristics such as ease of operation and simplicity of design. What is needed is a folding mechanism providing for improved folding of jogging strollers that is safe, dependable and more user friendly under different folding conditions.

It is thus an aspect of the present invention to provide a new and improved jogging stroller having a folding mechanism providing for improved folding characteristics, more user-friendly operation, and greater variation and flexibility under different folding conditions.

It is another aspect of the invention to provide a three-wheeled jogging stroller with a user-friendly foldable frame for an infant that may be utilized during jogging exercise and that is easily foldable for transit and storage.

It is also an aspect of the invention to provide a jogging stroller with removable wheels and a foldable or collapsible frame which may be readily assembled and disassembled, and which stroller is compact, stable and lightweight.

In accordance with another aspect of the invention, there is provided a folding mechanism such that a jogging stroller with removable wheels and a foldable or collapsible frame may be more readily folded and disassembled, for storage and transportation.

In accordance with yet another aspect of the invention, there is provided a folding mechanism for a three-wheeled jogging stroller that is simple in design, easily accessed and simple in operation to thus provide improved folding for transit and storage.

SUMMARY OF THE INVENTION

In accordance with the invention there is provided a three-wheeled jogging stroller having a foldable, or collapsible frame assembly that is transformable from a collapsed, position of reduced length and height to an erected, or upright, user position. The foldable frame assembly includes a base, or lower structural assembly, and an upper structural assembly. The base includes a rear axle assembly having a member of an enlarged diameter tubular construction with couples at opposite ends thereof for supporting de-mountable or removable large diameter spoked wheel pneumatic tires. The rear axle assembly has a fork assembly pivotally coupled thereto and a pair of upright support members. The fork assembly includes a pair of generally parallel fork members supporting the front wheel at one end thereof, and at the other end the fork members are pivotally coupled to the rear axle member by means of crank or clevis members. The pivotable coupling is displaced, or offset, a given distance from the axis of the rear axle member, so that on folding the fork and the upright support members are generally parallel to one another.

The upper structural assembly includes a handlebar assembly including a generally U-shaped handlebar member and handlebar tubes hingedly attached to the free ends of the U-shaped member. The U-shaped member has a brake lever for a caliper type brake which engages the rim of the front wheel. The U-shaped handlebar member is hingedly attached at each free end thereof to the handlebar tubes for folding down, or collapsing, the U-shaped member so that it is underneath and substantially parallel to the handlebar tubes. The other, or free, ends of each of the handlebar tubes are fixedly coupled to an interconnect member that is pivotally coupled to the free end of a respective upright member extending from the rear axle member. Substantially parallel tubes are at one end slidably engaged with a respective interconnect member and at the other end to a footrest. The interconnect member has hold and release means for holding the upper frame in an upright user position and for releasing the interconnect member to slide down the respective tube to collapse the upper frame over the base frame. Additional tubes each have first ends thereof pivotally coupled to support members attached at the forward end of the fork, the other ends of each of the tubes being fixedly coupled to the footrest.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 11 is a front elevational view of the stroller of FIG. 1;

FIG. 12 is a rear elevational view of the stroller FIG. 1;

DESCRIPTION OF THE PREFERRED EMBODIMENT

Figure 1:
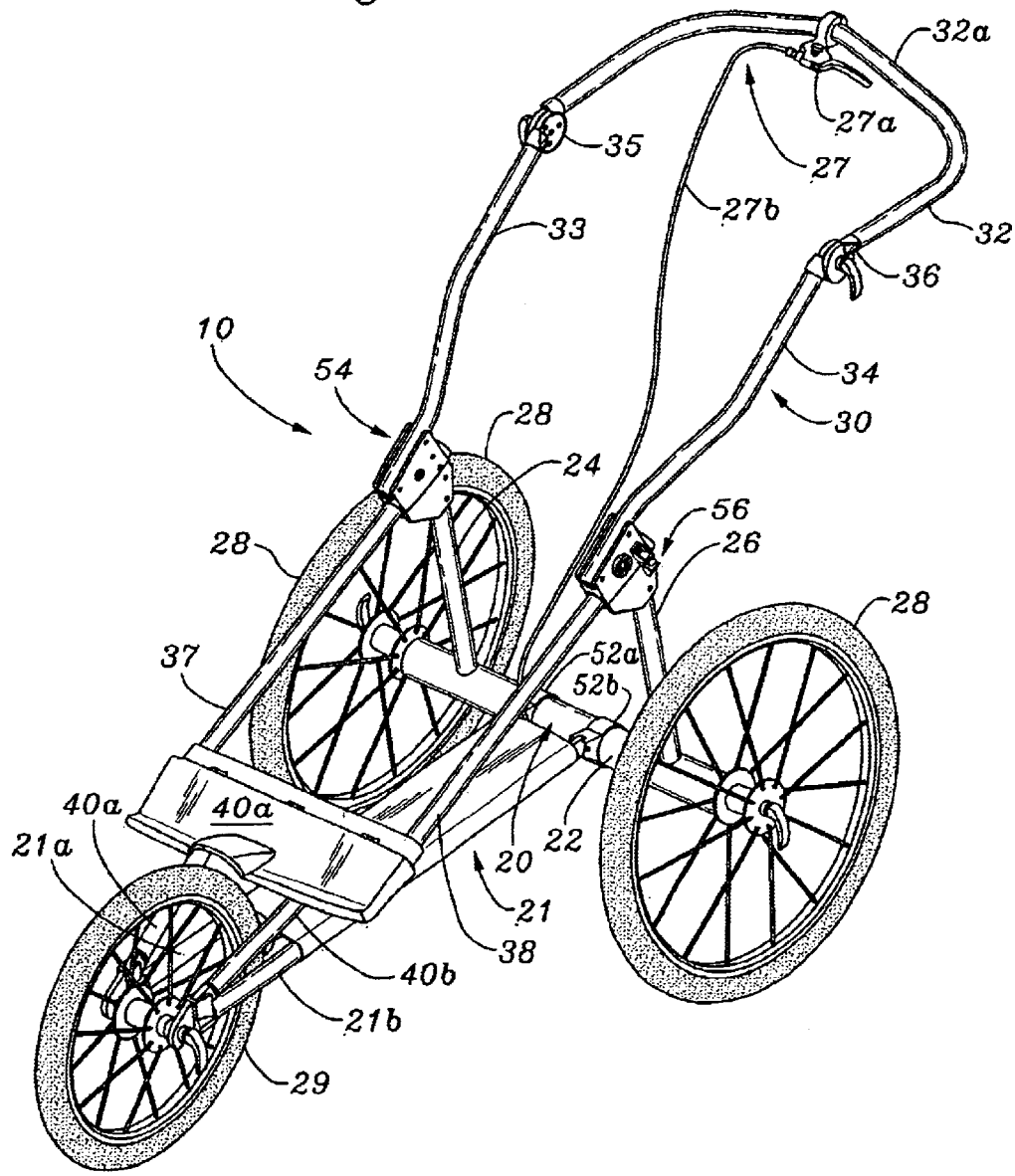
FIG. 1 is a perspective view of the foldable infant jogging stroller according to the invention.

Referring now to the drawings, and particularly to FIG. 1, in accordance with the invention there is shown a three-wheeled jogging stroller having a foldable, or collapsible frame assembly that is transformable from a collapsed, position of reduced length and height to an erected, or upright, user position.

The foldable frame assembly, generally designated 10, includes a base, or lower structural assembly, generally designated 20, and an upper structural frame assembly, generally designated 30. The base assembly 20 includes a rear axle member 22 of an enlarged diameter tubular construction with couples at opposite ends thereof for supporting identical de-mountable or removable large diameter spoked wheel pneumatic tires 28. The base assembly 20 further includes a pair of upright support members 24, 26, fixedly connected thereto and a fork assembly, generally designated 21 pivotally coupled thereto. As will be further explained hereinbelow, the other ends of upright members 24, 26, are pivotally coupled respectively to interconnect members 54, 56.

Figure 5:
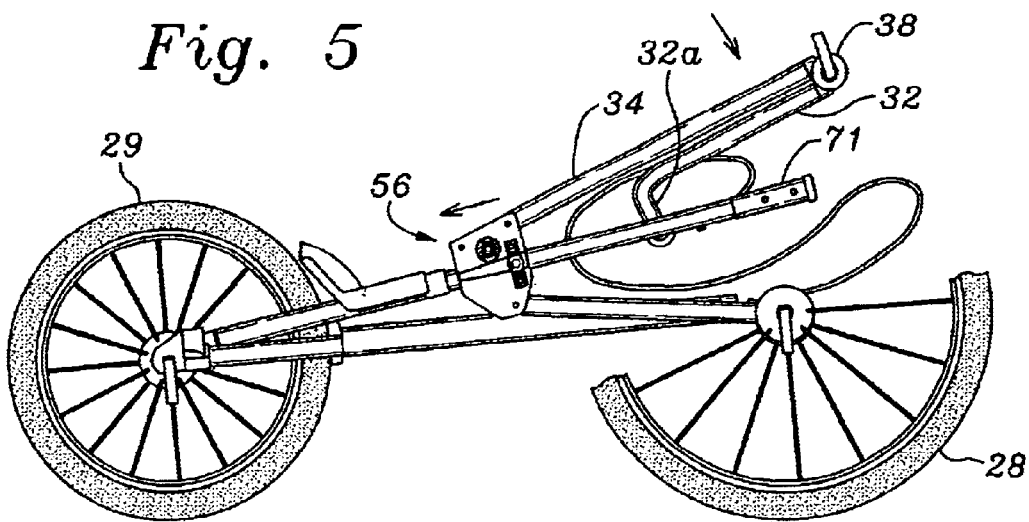
FIG. 5 is a left side elevational view of the foldable frame of the stroller of FIG. 1 showing the interconnect member completely displaced along a frame member to collapse the stroller.

The fork assembly 21 includes a pair of generally parallel fork tubes 21a, 21b, supporting the front wheel 29 at one end thereof, and at the other end the fork tubes are pivotally coupled to the rear axle member by means of couplers 52a, 52b. Couplers 52a, 52b, may be of any convenient configuration allowing for upright members 24, 26 to be folded forwardly over base assembly 20 as illustrated in FIG. 5. As shown, the pivotable couplers 52a, 52b are displaced, or offset, a given distance from the longitudinal center of the rear axle member 22, so that on folding, the upright support members 24, 26 fold downwardly to the outside of the fork assembly 21 to approach a near parallel relationship. In the embodiment illustrated couplers 52a, 52b are formed of a tubular portion that encircles and is secured to the rear axle member 22, and a stub portion for pivotally accepting and securing fork members 21a, 21b.

Figure 3:
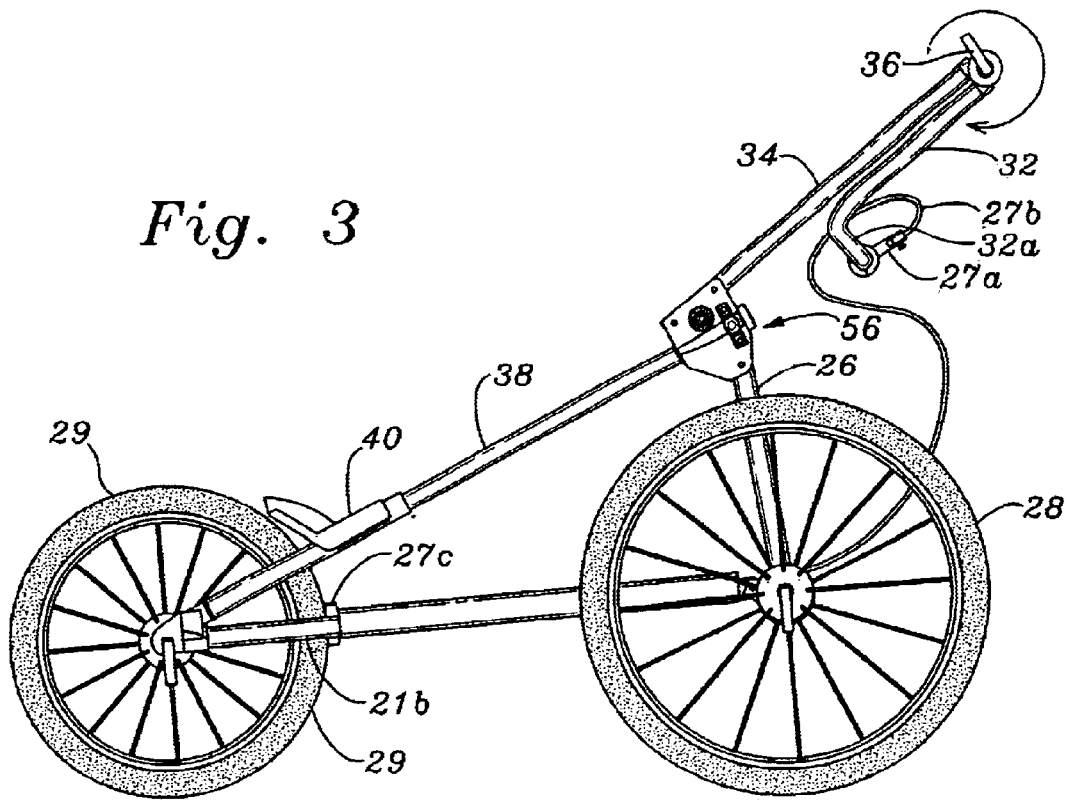
FIG. 3 is a left side elevational view of the foldable frame of the stroller of FIG. 1 showing the handlebar in a folded position.

The upper structural assembly 30 includes a handlebar assembly including a U-shaped handlebar member 32 and planar handlebar tubes 33, 34, attached by hinges 35, 36, to the free ends of the U-shaped member 32. By means of hinges 35, 36, U-shaped member 32 can be folded down, or collapsed, so that, as shown in FIG. 3, it is underneath and substantially parallel to the handlebar tubes 33, 34. The other, or free, ends of the handlebar tubes 33, 34, are fixedly coupled respectively to interconnect members 54, 56. The U-shaped member 32 has a brake lever assembly, generally designated 27, for a caliper type brake 27c that engages the rim of the front wheel 29, and may have handle-gripping material (not shown) as appropriate. The free ends of U-shaped member 32 are further apart than the interconnect members 54, 56, thus handlebar tubes 33, 34 have identical curvature inwardly to properly mate with interconnects 54, 56.

Figure 2:
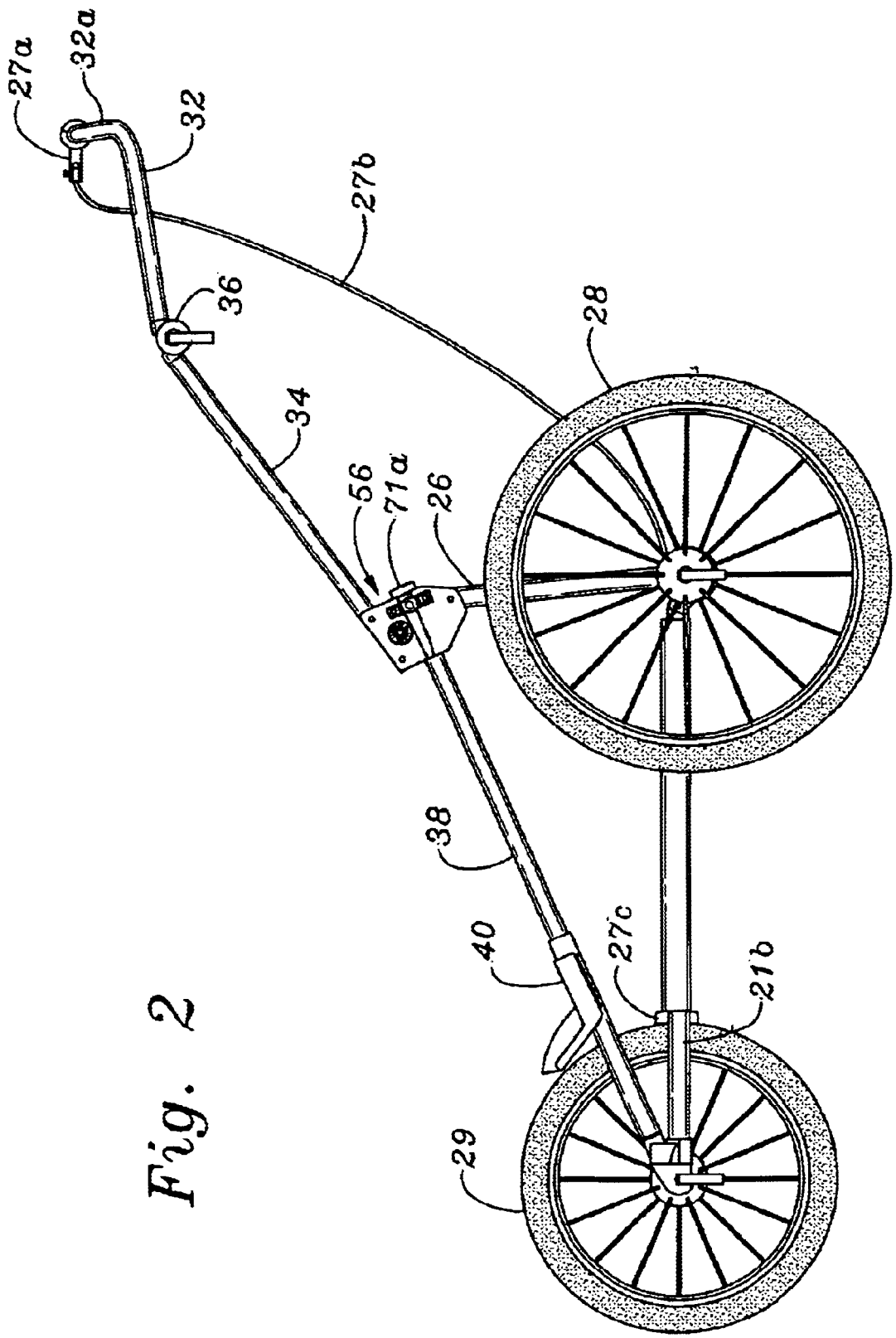
FIG. 2 is a left side elevational view of the foldable frame of the stroller of FIG. 1.

As indicated in FIG. 2, U-shaped member 32, by means of hinges 35, 36, is directed away from the plane of planar handlebar tubes 33, 34, to become nearly horizontal, and has an upturned pushing portion 32a to which brake lever 27a is attached substantially at the center thereof. The more horizontal orientation of the U-shaped member 32 and upturned pushing portion 32a contribute to more comfortable and optimum pushing force toward the axis of the front wheel 29.

Substantially parallel tubes 37, 38, are at one end slidably engaged with interconnect members 54, 56, respectively, and at the other end fixedly attached to a footrest 40. As shown more clearly in FIG. 6, each interconnect member 54, 56, has associated a hold and release assembly, generally designated 70, on the free end of its respective tube 37, 38. The hold and release assemblies are operable to hold the upper frame in an upright user position or for releasing the interconnect member to slide down the respective tube to thereby collapse the upper frame onto the base frame as shown in FIG. 5.

Additional tubes 40a, 40b each have first ends fixedly attached to the footrest 40 and then are converged inwardly for coupling the other ends thereof to parallel fork tubes 21a, 21b supporting the front wheel 29. The coupling to the wheel is in any conventional manner and of the type used in bicycles having quick-release wheels.

Footrest 40 is formed of a generally trapezoidally configured plate-shaped injected plastic material. It has the forward end thereof bent upwardly with a portion formed in cup-like manner over front wheel 29. The upraised or bent portion serves as a splash-guard in the event the front wheel comes into contact with ground water during use. Footrest 40 is dimensioned for snugly attaching, such as by welding or riveting, to opposite sides of the parallel tubes 37, 38, to provide additional front end stability.

Figure 6:
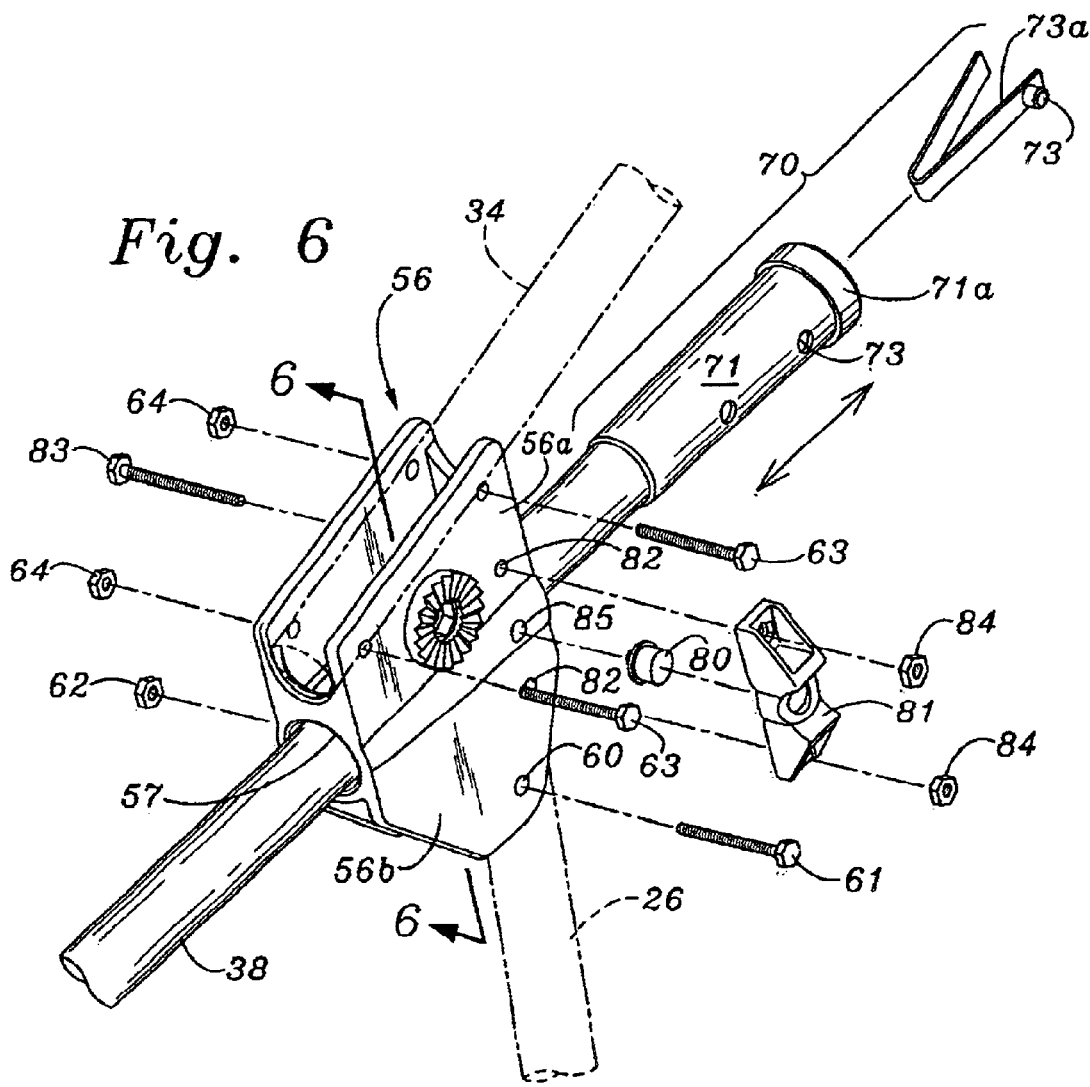
FIG. 6 is an exploded perspective view of the interconnection mechanism in accordance with the invention showing the interconnect member, slidable frame member with hold and release mechanism, and in phantom portions of the upright support tubes and handlebar frame portions.
Figure 7:
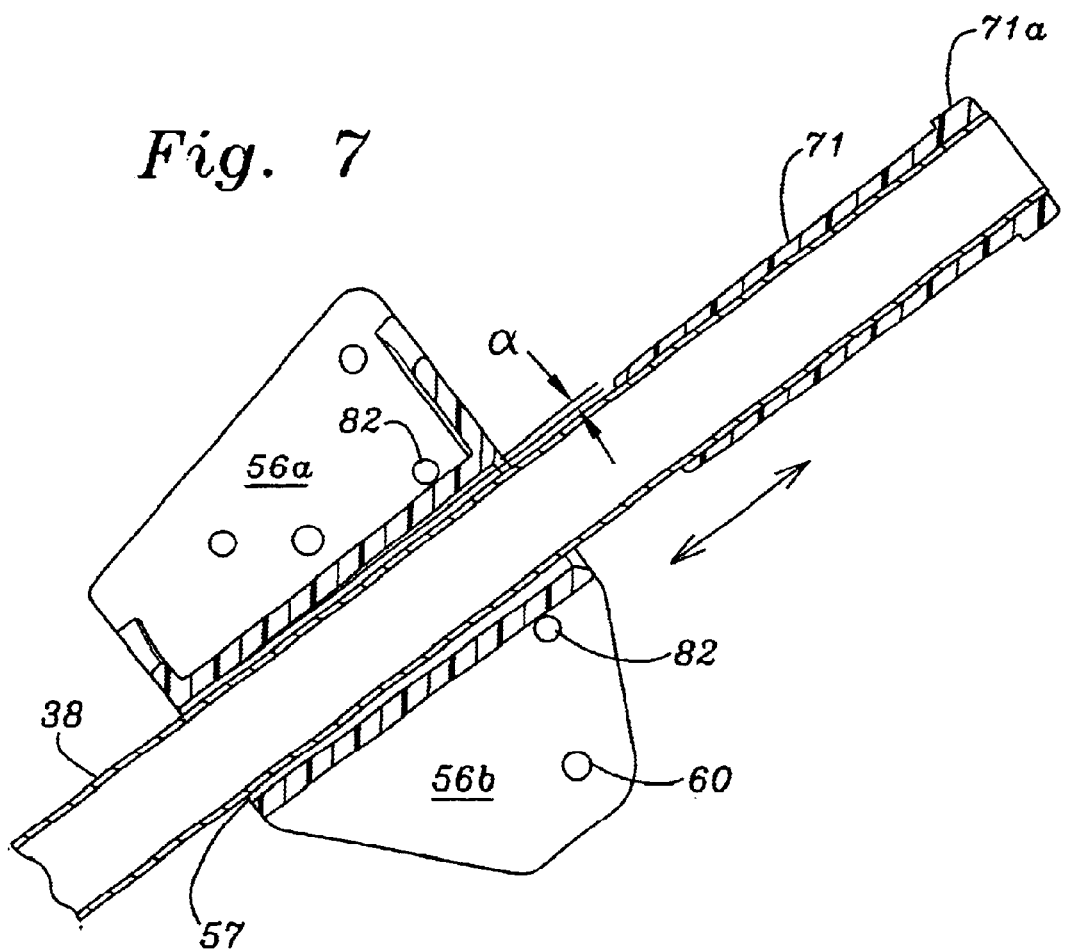
FIG. 7 is a cross-sectional view of the interconnect member of FIG. 6 taken along the line 6—6 thereof.

Referring to FIGS. 6–10, and particularly to FIGS. 6 and 7, there is shown the stroller folding mechanism of the invention consisting of interconnects 54, 56, and their associated hold and release assemblies attached to tubes 37, 38. By reference to one interconnect, in FIG. 6 there is shown interconnect 56 having a saddle-shaped main body portion 56a and a depending clevis portion 56b. Main body portion 56a is configured and dimensioned for receiving the free end of handlebar tube 34, shown in phantom, that is fixedly positioned and secured therein with first and second bolts 63 and nuts 64. Interconnect 56 further includes aperture 57 for slidably receiving upper frame tube 38 therethrough.

Clevis portion 56b pivotally receives, in any appropriate manner, the upper end of upright tube 26, shown in phantom.

Although not shown, this uppper end of upright 26 is terminated with a bar-shaped flange portion of a thickness less than the diameter of the upright tube 26 and slightly less than the distance between opposing sidewalls of the clevis 56b. The flange has an aperture therethrough for alignment with like sized aperture 60 extending through the walls of the clevis 56b. The aperture 60 is dimensioned for receiving a suitable fastener, such as a bolt 61 and nut 62 for pivotally connecting the upper end of the upright tube 26 to clevis portion 56b.

The hold and release mechanism for holding the stroller in an erect position and for releasing tube 38 for folding of the upper frame assembly includes catch and release assembly, generally designated 70, and release pushbutton 80. Hold and release assembly 70 includes sleeve 71 press-fitted over the free end of tube 38 and with locking button 73 and associated spring 73a inserted within tube 38. Except for sleeve cap 71a, sleeve 71 has a diameter less than the diameter of aperture 7 and can be tapered rearwardly upward as indicated by angle $\alpha$ to cap 71a to facilitate movement of sleeve 71 in and out of aperture 57. Aperture 57 is tapered by angle $\alpha$ for mating engagement with sleeve 71. Locking button 73 is mounted onto generally V-shaped spring 73a, the spring 73a dimensioned and positioned for continued spring tension within the interior of tube 38 to maintain locking button 73 protruding through aperture 72 in sleeve 71. In the erect, or non-folded state, sleeve 71 is fully inserted into aperture 57 with locking button 73 forced into interconnect aperture 85 by spring 73a to thereby lock the upper frame into the erect position.

Release pushbutton 80 is securely and slidably positioned within button holder 81, holder 81 mounted onto interconnect 56 over aperture 85 and secured by bolts 83 and nuts 84 through holes 82. Pushbutton 80 has a contact tip configured and dimensioned for penetrating aperture 85 and has sufficient freedom of depression, or free-floating movement, within holder 81 to disengage locking button 73 to thereby allow sleeve 71 to be released from interconnect 56. This in turn allows for sliding of the interconnect 56 downwardly along the tube 38 to thereby fold the upper structural assembly 30 over the lower structural assembly 20 as indicated in FIG. 5.

Thus, in the erected state, interconnect 56 is slid upwardly along tube 38 until sleeve 71 is inserted into aperture 57 and locking button 73 is forced into aperture 85 under tension from spring 73a to thereby lock the stroller in the erect state. For folding, pushbutton 80 is depressed to disengage locking button 73 from aperture 85 to permit sliding of interconnect 56 downwardly to the folding position.

Figure 4:
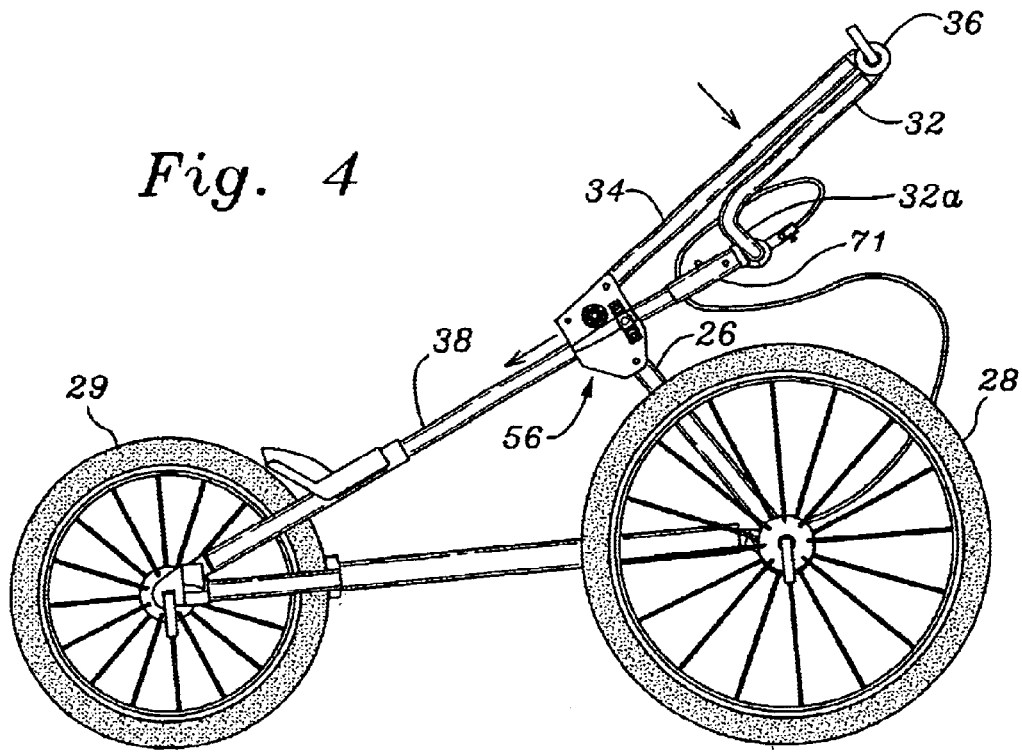
FIG. 4 is a left side elevational view of the stroller foldable frame of FIG. 1 showing the interconnect member partially displaced along a frame member in collapsing the stroller.
Figure 8:
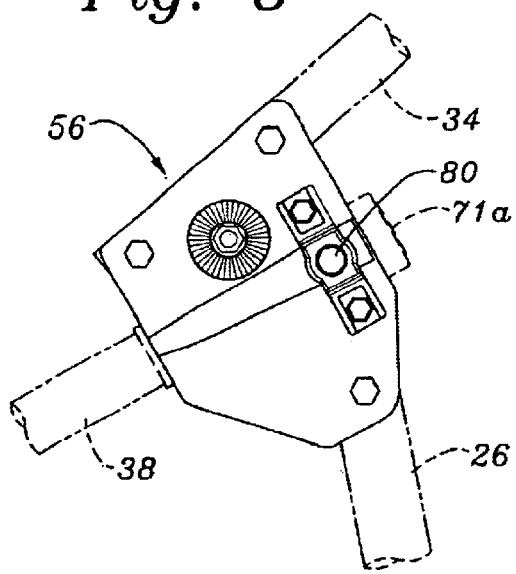
FIG. 8 is aside view of the interconnect member of FIG. 6 locked in the erect or user position.
Figure 9:
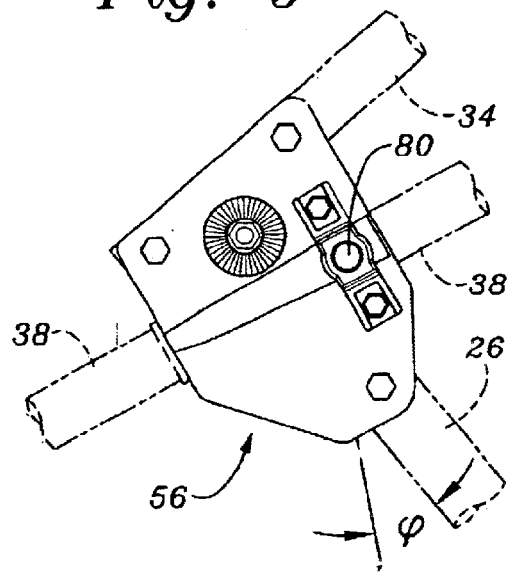
FIG. 9 is a side view of the interconnect member of FIG. 6 released as indicated in FIG. 4.
Figure 10:
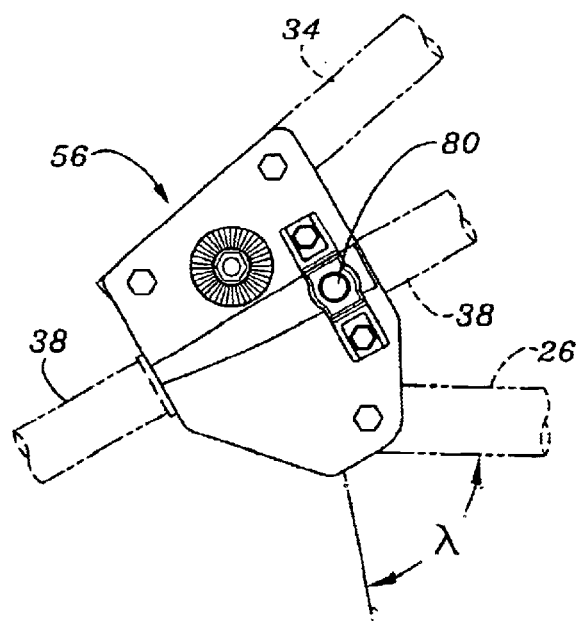
FIG. 10 is a side view of the interconnect member of FIG. 6 released as indicated in FIG. 5.
Figure 13:
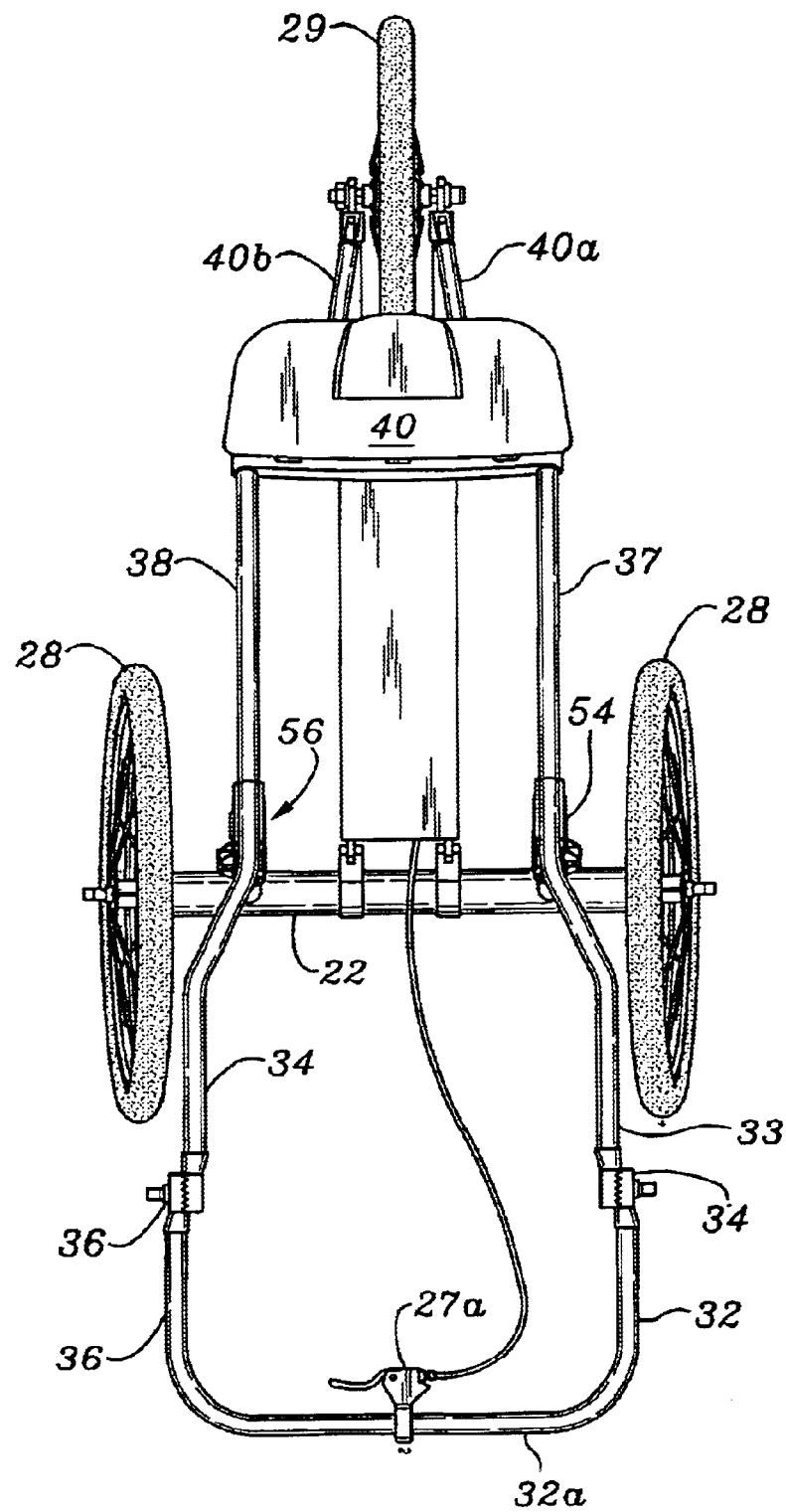
FIG. 13 is a top plan view of the stroller of Figure.
Figure 14:
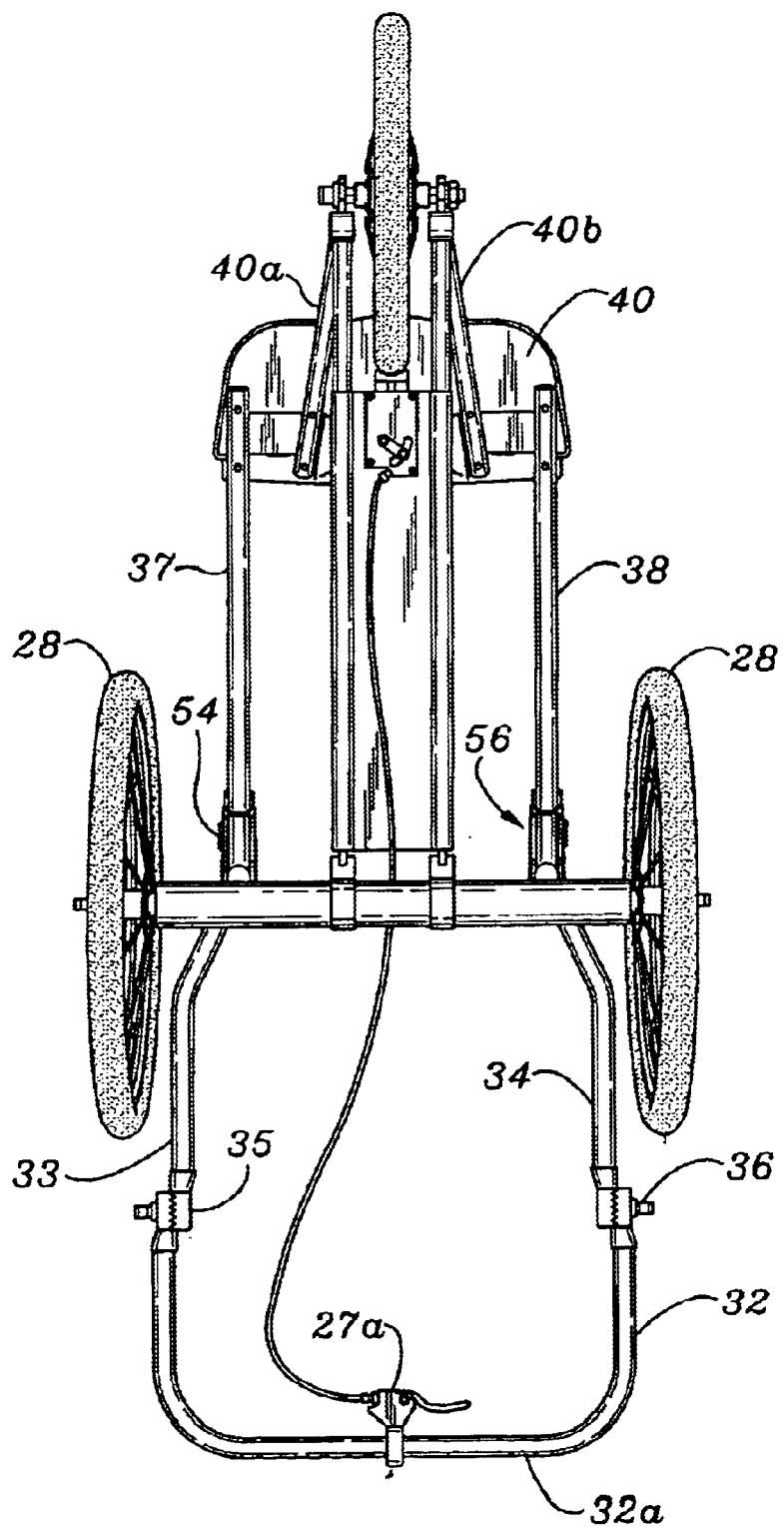
FIG. 14 is a bottom plan view of the stroller FIG. 1.

FIG. 2 shows the stroller in the fully erect, or useable, state with FIG. 8 showing the corresponding position of upright tube 26 within interconnect 56. FIGS. 3 through 5 show the frame assembly at various steps of folding. In FIG. 3 the handlebar portion 32 is pivoted clockwise into an underlying proximate position relative to the lower handlebar tubes 33, 34. As indicated in FIG. 4, the interconnects 54, 56, are released by pushbutton 80 to slide along tubes 37, 38, and uprights 24, 26, are pivoted counter-clockwise downwardly toward fork assembly 21 by pivoting at the upper ends thereof within interconnects 54, 56. FIG. 9 shows the corresponding new position of upright tube 26 pivoted through angle $\phi$ within interconnect 56 as indicated in FIG. 5. In FIG. 5 interconnects 54, 56 are slid further along tubes 37, 38 into approximate abutting relationship to footrest 40 and uprights 24, 26, are pivoted downwardly to the fullest extent alongside tubes 21a, 21b until the compact frame arrangement is achieved. FIG. 10 shows the corresponding position of upright tube 26 pivoted through angle $\lambda$ within interconnect 56 to the fully folded state of the stroller.

The saddle of the main body portion 56a has a depth and length sufficient to enable opposing sidewalls to receive a significant length of tube 34 snugly and fully therein in the depth-wise and length-wise directions. This provides stability at the coupling location so that wobbling and rattling is eliminated and the body portion 56a and tube 34 act as an integral unit during use.

The push handlebar portion 32 is generally U-shaped with opposing sides converging toward the front for engagement with hinges 35, 36. An unturned pushing portion 32a is provided at the bight thereof and may have gripping material appropriately wrapped in opposite directions from the center and extending around the corners. Centrally located on the bight portion is a lockable brake lever 27a for braking of front wheel 29 by means of a caliper type brake 27c via a brake cable 27b. The more horizontal orientation of the U-shaped member 32 and upturned pushing portion 32a contribute to more comfortable and optimum pushing force toward the axis of the front wheel 29.

FIGS. 11–14 more clearly illustrate certain elements and features of the stroller of the invention. For instance, FIGS. 11 and 12 illustrate how the rear wheels are canted to provide for improved stability and roadworthiness, and footrest 40 and the positioning of tubes 40a and 40b is more clearly illustrated. Also, the configuration of U-shaped handlebar 32, hinges 35, 36, and tubes 33, 34, is better illustrated.

The construction of the jogger stroller 10 is of aluminum tubing that, with the exception of the rear axle member 22, is of the same diameter, thus effecting economies of assembly. Further, with the exception of the handlebar portions 32, 33, and 34, the tubular stock consists of straight or linear lengths of material. The interconnects 54, 56 are formed of injected plastic of wall thickness sufficient to provide the required strength and stability at points of connection and configured to include pivot axes for providing support in the lengthwise directions of the tubes during operation of the stroller. The spacing between opposing walls closely approximate the diameter of the tube sections for lateral as well as lengthwise stability. In use, the stroller 10 is stable and efficient in the use of the energy of the operator, whether while walking, jogging or running.

While there has been shown and described a preferred embodiment, it is understood that other adaptations and modifications may be made without departing from the spirit and scope of the invention. Further, although the description has utilized directional references, such a up, down, left, right, upwardly, downwardly, etc, these terms are utilized with reference to the orientations in the figures are not intended to be limiting.

What is claimed is:

1. A foldable stroller for use while walking or running, said stroller comprising:

a rear axle assembly for supporting two rear wheels;

a pair of upright support tubes having first and second ends, the first ends fixedly coupled to said rear axle assembly;

a base fork assembly having first and second ends, said first ends pivotally coupled to said rear axle assembly;

wheel support means, affixed at said second ends of said base fork assembly, configured for supporting a front wheel;

an upper frame assembly including a generally U-shaped handlebar member capable of being gripped; first and second handlebar tubes; first and second hinges pivotally coupling respective ends of said U-shaped handlebar to first ends of said first and second handlebar tubes; third and fourth tubes having first and second ends; a footrest having said first ends of said third and fourth tubes fixedly attached thereto; fifth and sixth tubes having first and second ends, said first ends pivotally coupled to said support means at said second tube ends of said base fork assembly and said second ends fixedly attached to said footrest; and first and second generally identically configured interconnect members, each of said interconnect members including
- a) means for fixedly securing said second end of one of said first and second handlebar tubes;
- b) means for pivotally coupling thereto said second end of one of said upright support tubes; and
- c) means for slidably receiving therethrough said second end of one of said third and fourth tubes at a position which enables said interconnect member to slide freely along said second end of said third and fourth tubes to enable said upper frame assembly to fold from an erect position into a collapsed position overlying said base fork assembly.

2. The stroller of claim 1 wherein said second ends of said third and fourth tubes include hold and release means for locking said stroller in an erect position and for releasing said interconnect members to slide along respective ones of said third and fourth tubes to thereby collapse said stroller.

3. The stroller of claim 2 wherein each said interconnect member includes a release button for actuating said hold and release means to release said third and fourth tubes.

4. The stroller of claim 1 wherein each said interconnect member has a saddle shaped main body portion configured for receiving and securing said second end of a respective handlebar tube.

5. The stroller of claim 4 wherein each said interconnect member has a depending clevis portion for pivotal attachment to said second end of a respective upright support tube.

6. The stroller of claim 4 wherein each said main body portion has an aperture for slidable acceptance of a respective second end of said third and fourth tubes.

7. A foldable baby stroller, comprising:
- a base frame assembly including a rear axle member for supporting a pair of rear wheels, a pair of fork tubes having front end means for supporting a front wheel and rear end means for pivotally coupling to said rear axle member, and a pair of upright support tubes having first ends fixedly connected to said rear axle member;
- an upper frame assembly including a generally U-shaped handlebar assembly having first and second handlebar tubes extending from said handlebar assembly to second ends and third and fourth tubes having first ends supported by said means of said fork tubes for supporting a front wheel; and
- a pair of interconnect members fixedly connected to respective ones of said second front ends of said first and second handlebar tubes, pivotally connected to respective ones of said second ends of said support tubes, and including means for slidably receiving respective ones of second ends of said third and fourth tubes therein and enabling said interconnect members to slide freely along said third and fourth tubes enabling said upper frame assembly to fold from an erect position into a collapsed position overlying said base assembly.

8. A collapsible frame for a baby stroller, comprising:
- a rear axle for supporting two rear wheels and having a pair of upright support members with first ends fixedly attached to said rear axle;
- a fork assembly having a rear end pivotally attached to said rear axle and a front end supporting a front wheel;
- a handlebar assembly having first and second handlebar tubes extending from said handlebar assembly to second ends;
- third and fourth tubes having first ends supported by said front end of said fork assembly; and
- first and second interconnector means for fixedly receiving a respective second end of said first and second handlebar tubes and pivotally receiving respective second ends of said support members, said interconnector means configured and dimensioned to slide along respective second ends of said third and fourth tubes to enable said handlebar assembly to fold generally over said fork assembly.

9. The stroller of claim 8 wherein said interconnector means includes a main body portion and a depending clevis portion, said clevis portion configured for pivotally receiving and securing said respective second ends of said support members, and
- said main body portion having a saddle portion configured for receiving and securing a respective second end of said first and second handlebar tubes, and further including aperture means for slidably receiving therethrough a respective one of said third and fourth tubes.

10. The stroller of claim 9 wherein said main body portion and said respective one of said third and fourth tubes have coactive hold and release means for locking together and for unlocking one from the other.

11. An interconnect mechanism for folding a jogging stroller, comprising
- a main body portion and a depending clevis portion;
- said main body portion having a saddle portion configured for receiving and securing an end of a first frame tube;
- said clevis portion configured for pivotally receiving and securing an end of a second frame tube; and
- said main body portion further including means for receiving a third frame tube therethrough such that said main body portion is enabled to slide freely along said third frame tube.

12. The interconnect mechanism of claim 11 wherein said third frame tube in combination with said main body portion includes hold and release means for locking said third frame tube with said main body portion and for unlocking said third frame tube from said main body portion.

* * * * *